(12) United States Patent
Oosterhuis et al.

(10) Patent No.: US 8,869,927 B2
(45) Date of Patent: Oct. 28, 2014

(54) SAFETY SYSTEM WITH WINDOW BREAKER FOR A VEHICLE, VEHICLE PROVIDED THEREWITH AND METHOD THEREFOR

(75) Inventors: Antoon Siefko Oosterhuis, Heerenveen (NL); Mark De Beer, Amersfoort (NL); Rene De Beer, Amersfoort (NL); Adriaan Ids Stork, St. Annaparochies (NL)

(73) Assignees: A.S. Oosterhuis Beheer B.V., Heerenveen (NL); De Beer International Holding B.V., Barneveld (NL)

( * ) Notice: Subject to any disclaimer, the term of this patent is extended or adjusted under 35 U.S.C. 154(b) by 0 days.

(21) Appl. No.: 13/638,486

(22) PCT Filed: Jan. 27, 2011

(86) PCT No.: PCT/NL2011/050055
§ 371 (c)(1),
(2), (4) Date: Dec. 17, 2012

(87) PCT Pub. No.: WO2011/122941
PCT Pub. Date: Oct. 6, 2011

(65) Prior Publication Data
US 2013/0146381 A1    Jun. 13, 2013

(30) Foreign Application Priority Data
Mar. 31, 2010    (NL) ...................................... 2004482

(51) Int. Cl.
*B60R 21/00* (2006.01)
*B26F 1/00* (2006.01)
*B60R 21/017* (2006.01)
*B60R 21/0136* (2006.01)
*B60J 1/20* (2006.01)

(52) U.S. Cl.
CPC ....... *B60R 21/017* (2013.01); *B60R 2021/0027* (2013.01); *B60R 2021/0016* (2013.01); *B60R 21/0136* (2013.01); *B60J 1/20* (2013.01)
USPC ............................... 180/271; 30/367; 180/274

(58) Field of Classification Search
USPC ............ 30/358, 361, 366, 367; 180/271, 274, 180/282
See application file for complete search history.

(56) References Cited

U.S. PATENT DOCUMENTS

| | | | | |
|---|---|---|---|---|
| 3,741,583 A * | 6/1973 | Usui et al. | ...................... | 280/735 |
| 5,318,145 A * | 6/1994 | Vollmer | ......................... | 180/274 |
| 5,952,916 A * | 9/1999 | Yamabe | ......................... | 340/468 |
| 6,230,838 B1 * | 5/2001 | Adams | ........................... | 180/271 |
| 6,281,647 B1 * | 8/2001 | Sasaki | ........................... | 318/264 |
| 6,288,506 B1 * | 9/2001 | Hiwatari | ....................... | 318/283 |
| 6,337,550 B1 * | 1/2002 | Takahashi et al. | ............ | 318/483 |

(Continued)

FOREIGN PATENT DOCUMENTS

GB            2356212            5/2001

*Primary Examiner* — Paul N Dickson
*Assistant Examiner* — Laura Freedman
(74) *Attorney, Agent, or Firm* — Marcus C. Dawes; Daniel L. Dawes

(57) ABSTRACT

A safety system for a vehicle, a vehicle provided therewith and a method for breaking a window. The safety system comprises a window breaker comprising a drive system and a pin driven by the drive system for breaking a window. A water sensor is operatively connected to the drive system for control thereof.

12 Claims, 4 Drawing Sheets

(56) References Cited

U.S. PATENT DOCUMENTS

| | | | |
|---|---|---|---|
| 6,486,630 B2 * | 11/2002 | Takagi | 318/445 |
| 6,489,739 B2 * | 12/2002 | Maldonado | 318/445 |
| 6,551,159 B1 * | 4/2003 | Spinelli et al. | 441/80 |
| 6,588,532 B1 * | 7/2003 | Adams et al. | 180/271 |
| 6,733,036 B2 * | 5/2004 | Breed et al. | 280/735 |
| 6,816,064 B1 * | 11/2004 | Ruiz | 340/321 |
| 7,028,874 B2 * | 4/2006 | Lin | 225/93 |
| 7,232,001 B2 * | 6/2007 | Hakki et al. | 180/271 |
| 7,246,676 B2 * | 7/2007 | Cantu | 180/268 |
| 7,407,188 B2 * | 8/2008 | Wildig et al. | 280/756 |
| 7,861,460 B1 * | 1/2011 | Costello et al. | 49/141 |
| 7,988,078 B1 * | 8/2011 | Roy et al. | 241/33 |
| 8,073,577 B2 * | 12/2011 | Kitamura et al. | 701/1 |
| 8,419,062 B2 * | 4/2013 | Landini et al. | 280/756 |
| 8,727,060 B1 * | 5/2014 | Erickson et al. | 180/271 |
| 2003/0071446 A1 * | 4/2003 | Haderer et al. | 280/735 |
| 2004/0050607 A1 * | 3/2004 | Souther | 180/271 |
| 2004/0050608 A1 * | 3/2004 | MacDougall | 180/271 |
| 2004/0140142 A1 * | 7/2004 | MacDougall | 180/271 |
| 2013/0325265 A1 * | 12/2013 | Percher | 701/49 |

* cited by examiner

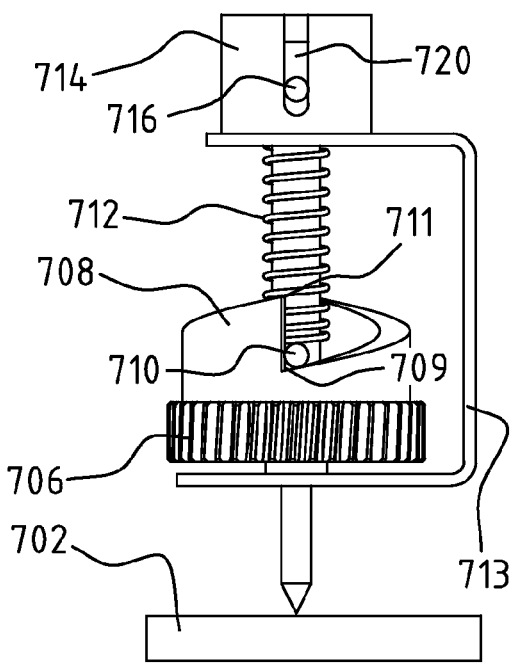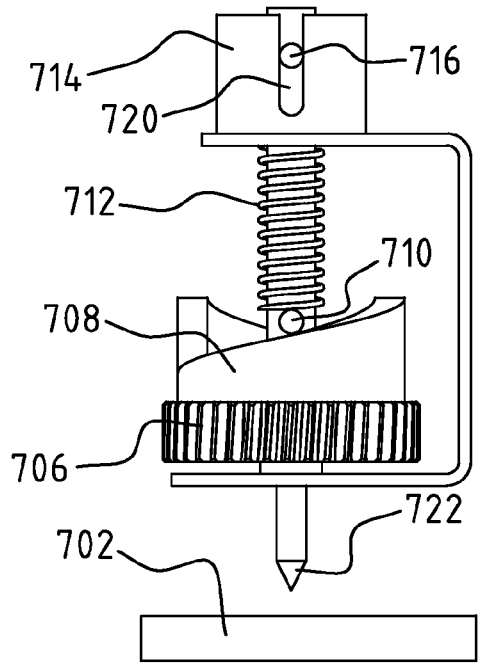
FIG. 6A　　　　　　　　FIG. 6B
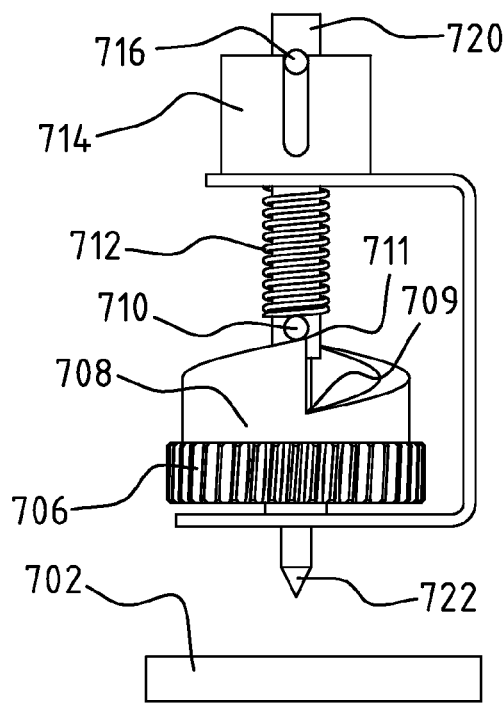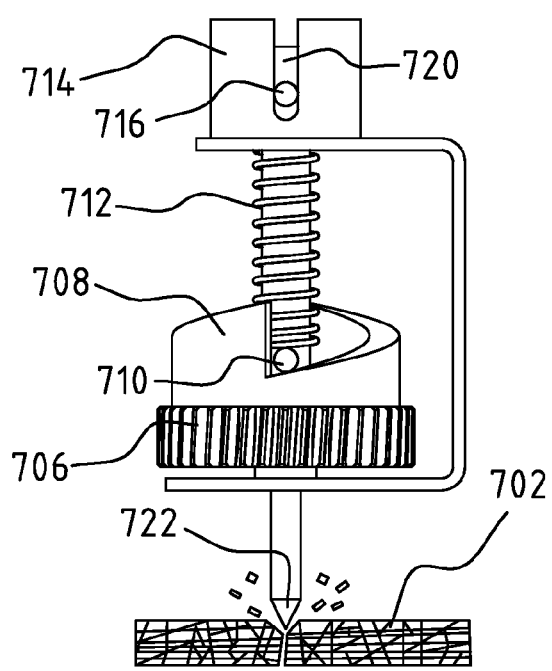
FIG. 6C　　　　　　　　FIG. 6D

SAFETY SYSTEM WITH WINDOW BREAKER FOR A VEHICLE, VEHICLE PROVIDED THEREWITH AND METHOD THEREFOR

RELATED APPLICATIONS

The present application is related to PCT International Application, serial no. PCT/NL2011/050055, filed on Jan. 27, 2011, and Netherlands Patent Application, serial number 2004482, filed on Mar. 31, 2011, which are incorporated herein by reference and to which priority is claimed pursuant to 35 USC 119.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The disclosure relates to the field of vehicle safety, specifically the invention relates to a safety system comprising a window breaker.

2. Description of Related Art

Such systems can break a window of a vehicle in automated manner in the case of an accident, such as a vehicle falling into water, fire or a collision. The invention relates particularly to a safety system for breaking a window when a vehicle falls into water.

Known in practice are window breaking systems which must be activated manually. Such systems have the drawback that passengers of a vehicle involved in an accident are often unable to activate such a system, let alone within the short time required for the purpose. Passengers can panic or be unfamiliar with the system, whereby they do not know how it has to be activated.

BRIEF SUMMARY OF THE INVENTION

An object of the invention is to obviate or alleviate the above stated problems and to provide a reliable and effective safety system.

This object is achieved with the safety system according to the invention, comprising:
a window breaker comprising:
 a drive system; and
 a pin driven by the drive system for breaking a window;
activating means operatively connected to the drive system for control thereof,
wherein the activating means comprise a water sensor for controlling the drive system therewith.

A fall into water can be detected by providing the safety system with a water sensor. If the water sensor detects a fall into water, the drive system is controlled and the pin thereby driven in order to break the window of the vehicle. The window is hereby broken within a very short time of the vehicle falling into water so as to thus provide an escape route for the passengers. The rescue time is shortened considerably as a result. The rapid activation of the window breaker according to the invention is advantageous, certainly in view of the fact that when a vehicle falls into water there is often less than a minute to escape. The passengers do not have to search themselves for a "life hammer". An automatic activation of the window breaker moreover guarantees that the window is broken in the case of a fall into water, even if the passengers are in a state of panic or otherwise unable to take action themselves.

The water sensor for instance comprises a floating magnet and a magnetic switch, a sensor based on the conduction of water, a capacitive sensor or an optical sensor.

In the safety system according to the invention the drive system for instance comprises a compressed air drive. It is also possible for the drive system to comprise a magnetic drive. The pin is for instance provided with a coil and these are enclosed by a magnet. The pin is set into movement by sending a current through a coil.

In a preferred embodiment of the invention the water sensor is accommodated in a separate housing.

The separate housing for the water sensor makes it freely placeable in the vehicle. This enables placing for instance at the front bumper without loss of functionality. The response time of the system can for instance hereby be influenced. This moreover prevents the sensor detecting water on the basis of for instance condensation or splash-water. A reliable and robust safety system is hereby obtained.

The water sensor is preferably accommodated in a housing provided with openings. These openings provide an outlet for water which may be present in the housing.

In a preferred embodiment according to the invention the water sensor is accommodated in a housing which is provided with openings such that, if the housing is situated in water, it is filled within a determined period of time.

By suitable positioning and dimensioning of the openings and a suitable choice of the number of openings (including one), the time in which the housing is filled when it is situated in water can be determined. In many cases a rapid activation of the safety system will be desirable. This can be achieved for instance with relatively large openings. If it is desirable for a determined time delay to occur before the water sensor in the housing detects water and subsequently activates the system, it is possible to opt for smaller openings and/or fewer openings. An additional advantage is that the sensitivity of water detection can be adjusted by opting for a suitable number, location and dimensions of the openings.

In a preferred embodiment the water sensor is embodied such that it activates the drive system if the sensor is substantially wholly enveloped by water.

A false alarm due to for instance condensation or splash-water is further avoided by activation of the drive system when the sensor is substantially wholly enveloped by water. The water sensor is preferably embodied such that it transmits an activation signal to the drive system only in the case of a detection signal lying above a certain threshold value. Additionally or alternatively electronics can for instance be provided, whereby the water sensor only activates the drive system when the signal persists for a determined period of time.

In a further preferred embodiment the water sensor comprises at least two detection elements.

Embodying the water sensor as a combination of at least two detection elements achieves that the reliability of the water detection is further increased. The drive system is for instance only activated when all detection elements detect water and are preferably substantially wholly enveloped by water. The system is hereby less susceptible to detection errors by individual detection elements. The at least two detection elements are preferably placed at a predetermined mutual distance. This achieves that the two detection elements detect water in a different zone, whereby local conditions are less important and a reliable detection is thus obtained.

In an advantageous embodiment of the invention the safety system comprises a capacitor for energy supply.

This achieves that the safety system can also be activated in reliable manner in the case that an accumulator or battery no longer functions due to a vehicle falling into water.

In a preferred embodiment according to the invention the activating means control the drive system with a predetermined time delay.

Providing the control with a time delay achieves that the safety system starts breaking one or more windows of the vehicle some time after activation. This has the advantage that passengers can prepare themselves for the one or more windows being broken by the window breaker in the system. The safety system can also be deactivated in good time if, for whatever reason, breaking of the windows of a vehicle is not desired.

In a further preferred embodiment according to the invention the time delay amounts to 1-30 seconds, preferably 1-10 seconds and most preferably about 7 seconds.

Said time intervals are sufficiently long to give passengers the opportunity to prepare themselves for breaking of the one or more windows, and short enough to guarantee the safety of the passengers.

In an advantageous preferred embodiment according to the invention the safety system comprises signalling means controlled by the activating means for the purpose of generating a warning signal.

The signalling means can for instance comprise lamps or loudspeakers. A combination is of course also possible. Providing signalling means achieves that passengers can be warned. A warning signal is preferably generated immediately following activation of the system.

The signalling means can also be adapted to generate a warning signal for persons outside the vehicle in which the safety system is installed. Bystanders or emergency services can for instance be alerted. Automatic alerting of emergency services achieves that they can be at the location of the accident in good time.

The signalling means can for instance also comprise lighting around a window of the vehicle. Providing this lighting indicates where the windows of the vehicle are situated. The window to be broken is preferably illuminated with such lighting.

It is for instance also possible to provide lighting on the outside of the vehicle. Such a light signal can for instance alert bystanders. In addition, such lighting is particularly advantageous when a vehicle falls into water since emergency services can then easily locate the vehicle.

The safety system preferably comprises both signalling means and a time delay in the control. The activating means control the signalling means such that a warning signal is generated. This warning signal can warn the passengers that the windows will be broken. The windows are then broken following the predetermined time delay.

The signalling means preferably comprise loudspeakers which can play a spoken message. The spoken message can for instance urge the passengers to remain calm and inform them that the windows will be broken. It is for instance also possible to calm the passengers by announcing that the emergency services have been alerted. In this way the system functions as a rescue escape guidance system. The rescue time is shortened considerably with the safety system according to the invention.

In an advantageous preferred embodiment according to the invention the safety system further comprises an operating means for manual switch-on and switch-off of the activating means.

Providing a manual operating means enables the passengers to activate or deactivate the window breaker at all times. Activation is advantageous in the case where the passengers consider that there is an emergency situation for which the windows of the vehicle must be broken, for instance in the case of an accident other than falling in water, where no automatic activation is brought about by means of the water sensor but where it is nevertheless desirable to break the window. Deactivation is advantageous in the case that, for whatever reason, it is not desirable for the system to break the windows, for instance in the case of false alarm.

Providing a manual operating means is particularly advantageous in combination with the predetermined time delay and the signalling means. As soon as the safety system is activated this is made known by the signalling means. Owing to the predetermined time delay and the manual operating means it is possible to interrupt the system before the system goes on to break one or more windows. In the case of automatic activation it can be desirable to interrupt the system if the accident is found to be less serious than thought. It is for instance possible to envisage interrupting the safety system when the vehicle falls into very shallow water.

In a presently preferred embodiment of the invention the drive system comprises an explosive charge. The drive system for instance comprises a plastic explosive.

A powerful and rapid driving of the pin of the window breaker is obtained by means of the explosive charge. The window breaker of the safety system can moreover take a compact form due to the explosive charge.

In a preferred embodiment according to the invention the pin of the window breaker moves reciprocally in continuously repetitive manner during use.

Following once-only activation of the activating means, the pin continues striking the window to be broken repeatedly. This guarantees up to a certain point that the window is broken. During use the pin preferably moves reciprocally substantially in its longitudinal direction.

For the purpose of this repetitive embodiment the drive system for instance comprises:
  an electric motor;
  a spring which is coupled to the pin and which moves substantially in the longitudinal direction of the pin;
  a rod which is connected to the pin and which lies substantially perpendicular of the longitudinal direction of the pin and the spring;
  a cam which is driven directly or indirectly by the electric motor and which rotates around the pin during use, wherein the side of the cam directed toward the rod comprises a closed edge surface on which the rod supports; and a rotation blocking coupled to the pin for the purpose of preventing significant rotation of the pin,
wherein the edge surface rises gradually, as seen in the direction opposite to the rotation of the cam, from a first height to a second height in the direction of the rod and then falls away sharply to the first height.

The edge surface of the cam for instance comprises two lowest points and two highest points so that the pin makes two striking movements in one rotation of the cam. The advantage of applying more than one highest and lowest point is that the stability of the striking pin is increased. The cam can for instance be driven in that it is placed on a toothed wheel driven directly or indirectly by the electric motor.

The window breaker is optionally embodied such that during use the pin strikes increasingly harder. This achieves that the force exerted is sufficient to break the window. This avoids an excessive force whereby the glass flies in all directions.

In a preferred embodiment according to the invention the safety system comprises safety means controlled by the activating means and from the group consisting of:
  automatic alerting of emergency services;
  means for transmitting a GPS position;
  automatic seatbelt release means; and
  oxygen supply.

Providing GPS enables the safety system to transmit a position determination. Emergency services can hereby quickly localize the vehicle after an accident in which the vehicle falls into water.

Providing automatic seatbelt release means achieves that passengers can leave the vehicle quickly or can be freed from the vehicle quickly.

Providing an oxygen supply achieves that passengers can be administered oxygen in the case of falling into water.

An oxygen supply is for instance embodied as an oxygen mask coupled to an oxygen reservoir.

The invention further relates to a vehicle provided with the safety system as described above, wherein the window breaker is positioned close to a window of the vehicle such that the pin breaks the window through activation of the system and the safety system is preferably integrated wholly or partially into the vehicle.

The same advantages and effects apply to such a vehicle as to the safety system as described above.

A vehicle can for instance be a car, a bus, a train, a boat, a tram, an underground train or an aircraft.

The safety system is for instance integrated with the vehicle by integrating the window breaker in a door or wall of the vehicle. The window breaker is thereby positioned close to a window to be broken, resulting in a compact installation. Other elements of the safety system, such as signalling means and manual operating means, can also be integrated into the door or wall, or for instance in the dashboard or elsewhere in the vehicle.

In an embodiment according to the invention the window breaker is positioned such that the pin is targeted at a side edge, i.e. the peripheral side, of the window.

In other words, the pin is oriented in a direction substantially parallel to the plane of the window. By directing the window breaker at the side edge of a window a compact installation of the safety system according to the invention becomes possible.

The invention further relates to a method for breaking a window, comprising of providing a safety system as described above.

The same advantages and effects apply to such a method as described for the safety system and the vehicle.

BRIEF DESCRIPTION OF THE SEVERAL VIEWS OF THE DRAWINGS

Further advantages, features and details of the invention are elucidated on the basis of preferred embodiments thereof, wherein reference is made to the accompanying drawings, in which:

FIGS. 6A-D show side views of the operating principle of the window breaker of FIG. 5.

DETAILED DESCRIPTION OF THE INVENTION

Figure 1:
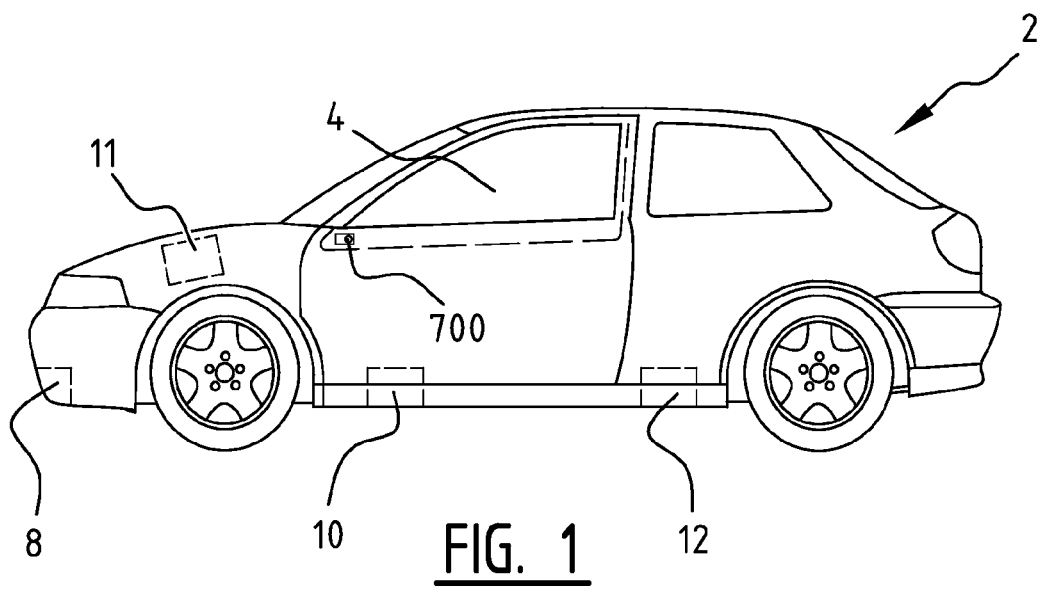
FIG. 1 shows a car with an integrated safety system according to the invention.

Car 2 (FIG. 1) comprises a safety system according to the invention. Window breaker 700 is positioned close to a window 4 of car 2 such that it can break window 4. In this exemplary embodiment car 2 comprises a window breaker 700 integrated into the door. The safety system moreover comprises a water sensor in a housing, which can for instance be provided at positions 8, 10, 11 or 12. In a presently preferred embodiment the water sensor is situated under the bonnet, at position 11.

Figure 2:
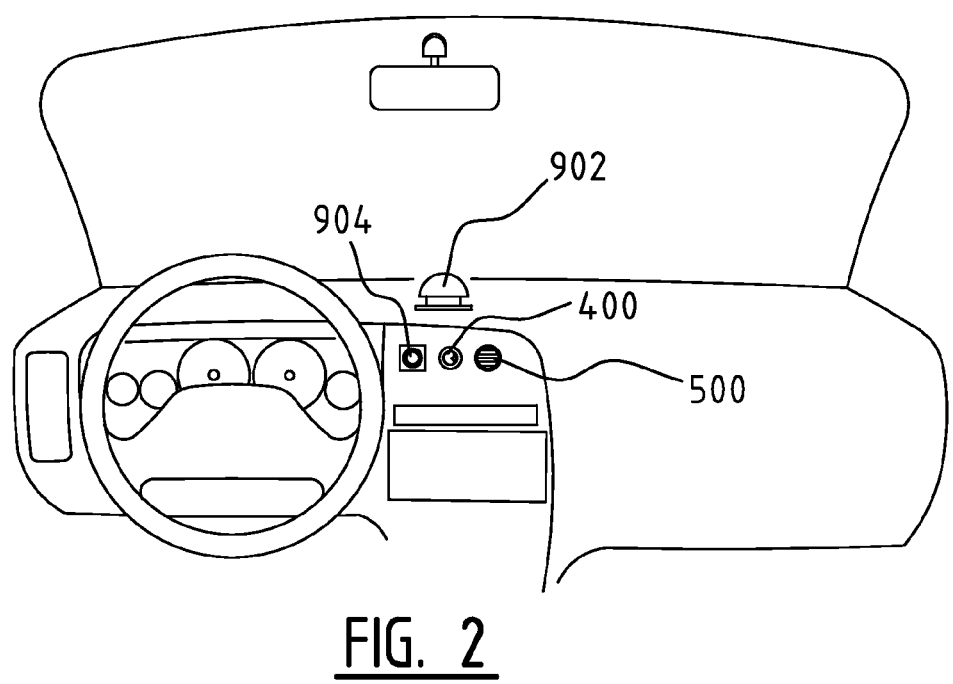
FIG. 2 shows the interior of the car of FIG. 1.

Signalling means, i.e. buzzer 500 and LED 400, are provided in the dashboard of car 2 (FIG. 2). Further situated in the dashboard is manual operating means 902, 904 with which the safety system can be deactivated (deactivation knob 902) or manually (re)activated (activation knob 904). It is for instance also possible to embody the safety system without activation knob 904 or to combine activation knob 904 and deactivation knob 902 and embody them as one knob.

An exemplary embodiment of the electrical circuit diagram of a safety system (FIG. 3) comprises detection means 100, including water sensors 102, 104. Water sensors 102, 104 of detection circuit 100 are connected to water detection circuit 200. This circuit comprises resistors 202, 204, transistor 206, connection 208 and earth contact 210.

Water detection circuit 200 is connected to relay circuit 800. This circuit comprises connections 802 and 804. If the water detection circuit 200 determines on the basis of electrical signals from detecting means 100 that water has been detected, relay circuit 800 switches and time delay circuit 600 is activated. Circuit 600 comprises diodes 606, 608, 610, 612, 618, 656, resistors 621, 624, 646, 648, 634, 637, 660, 664, 668, 670, polarized capacitors 614, 620, capacitors 622, 636, 662, transistors 632, 644, integrated circuits 626, 628, LED 652 and relay 658. Circuit 600 activates window breaker 700 with a time delay. Pulsing circuit 300 is switched on without time delay.

Pulsing circuit 300 comprises resistors 302, 304, 306, 308, variable resistors 312, 314, LED 310, transistors 320, 382, and polarized capacitors 316, 318. Circuit 300 controls buzzer 500 and LED 400. Immediately after water has been detected by means of circuit 200 a buzzer 500 hereby sounds and a flashing light 400 can be seen. After a time delay window breaker 700 will then be activated by circuit 600 in order to break the window.

Figure 3:
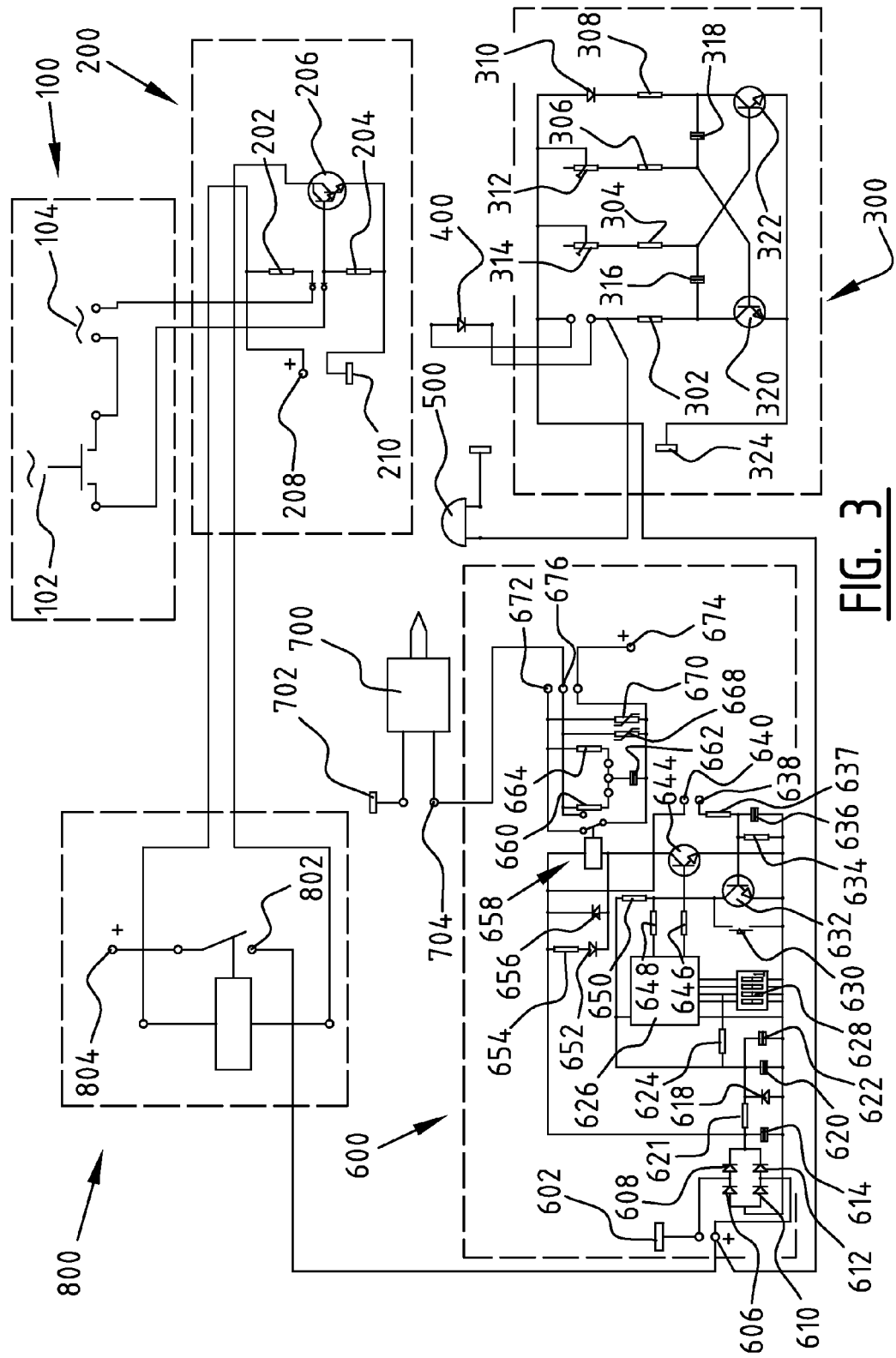
FIG. 3 shows a schematic drawing of a circuit of the safety system according to the invention.

The values and types of diverse elements of FIG. 3 are shown in the table below.

Water detection circuit 200

| Element | Value/type |
| --- | --- |
| resistor 202 | 10 kOhm |
| resistor 204 | 479 kOhm |
| transistor 206 | BC517 |

Pulsing circuit 300

| Element | Value /type |
| --- | --- |
| resistor 302 | 1 kOhm |
| resistor 304 | 10 kOhm |
| resistor 306 | 10 kOhm |
| resistor 308 | 1 kOhm |
| variable resistor 312 | 250 kOhm |
| variable resistor 314 | 250 kOhm |
| capacitor 316 | 10 uF |
| capacitor 318 | 10 uF |
| transistor 320 | BC547B |
| transistor 322 | BC547B |

Time delay circuit 600

| Element | Value/type |
| --- | --- |
| diode 606 | IN4007 |
| diode 608 | IN4007 |
| diode 610 | IN4007 |
| diode 612 | IN4007 |
| Zener diode 618 | 5V1/0.5 W |
| diode 656 | IN4148 |
| capacitor 614 | 100 uF/35 V |
| capacitor 620 | 100 uF/35 V |
| capacitor 622 | 200 nF |
| capacitor 636 | 100 nF |
| capacitor 662 | 100 nF/250 V |
| transistor 632 | BC547 |
| transistor 644 | BC547 |
| resistor 621 | 1 kOhm |
| resistor 624 | 10 kOhm |
| resistor 634 | 1 kOhm |
| resistor 637 | 1 kOhm |
| resistor 646 | 10 kOhm |
| resistor 648 | 10 kOhm |
| resistor 650 | 10 kOhm |
| resistor 654 | 1 kOhm |
| resistor 660 | 220/0.6 W |
| resistor 664 | 220/0.6 W |

The operation of the circuit diagram (FIG. 3) is assumed known to the skilled person.

Figures 4, 5:
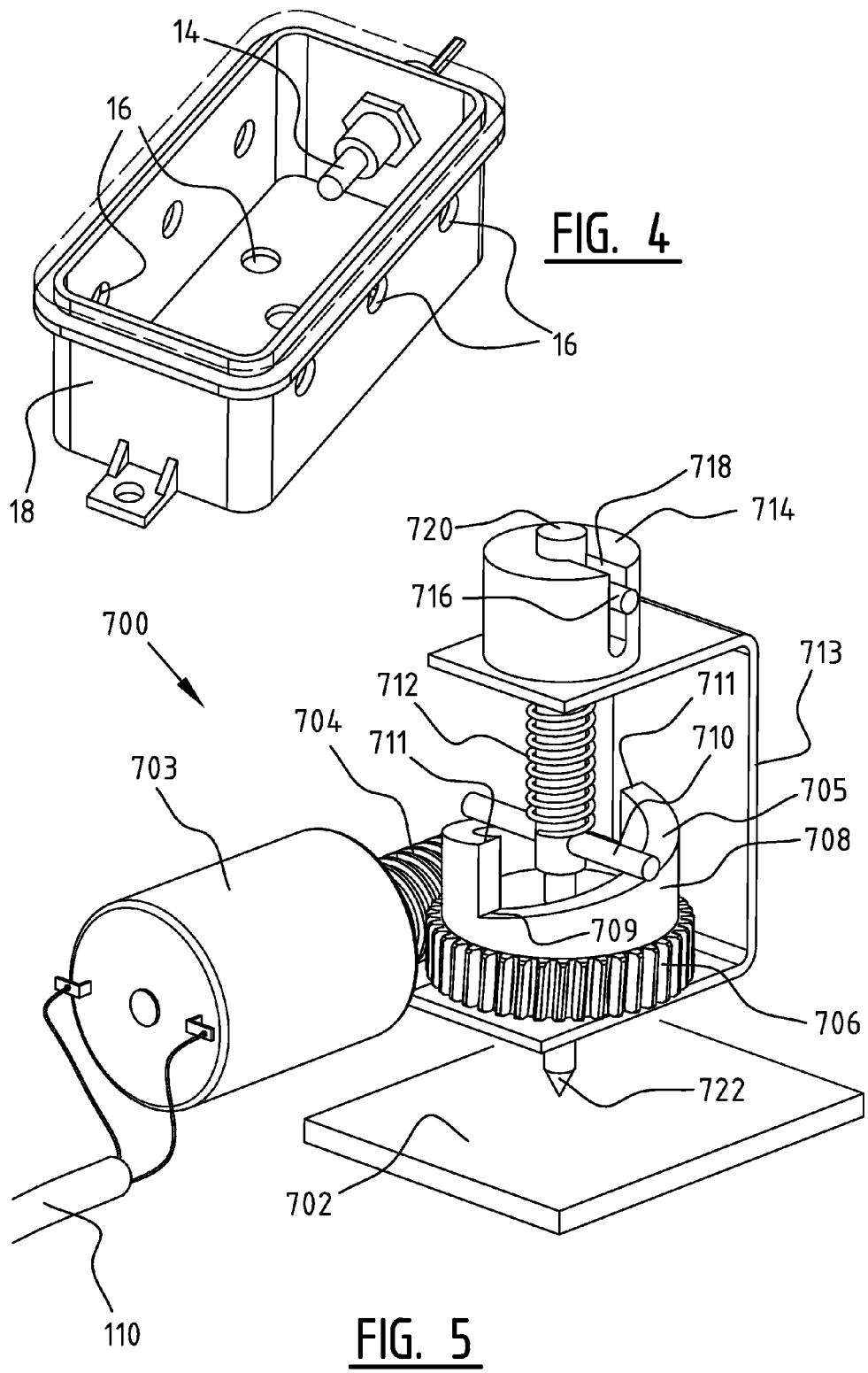
FIG. 4 shows a housing with water sensor for the safety system according to the invention.
FIG. 5 shows a view of a possible window breaker for a safety system according to the invention.

FIG. 4 shows housing 18. Housing 18 comprises water sensor 14. Housing 18 is provided with openings 16. Water sensor 14 is disposed in housing 18 such that it is clear of the side walls.

Window breaker 700 according to the embodiment shown in FIG. 5 comprises an electric motor 703 and a hard pin 720 with tip 722. Window breaker 700 is situated close to a window 702 such that tip 722 of hard pin 720 can strike the window in order to break it. Electric motor 703 drives toothed wheel 706 by means of worm wheel 704. A hollow cam 708 is situated on toothed wheel 706. Hollow cam 708 comprises an edge surface 705 on which rests a rod 710. Edge surface 705 rises from a first height 709 to a second height 711 and then falls away sharply to the first height 709. In the shown embodiment the hollow cam has two highest points 711 and two lowest points 709.

The rod 710 resting on edge surface 705 of hollow cam 708 is connected to hard pin 720. A spring 712 is arranged around pin 720. Toothed wheel 706, hollow cam 708, rod 710 and spring 712 are enclosed by a U-shaped plate 713. Situated on the upper side of plate 713 is a second cam 714 in which a channel 718 is arranged for receiving the rod 716 which is fixed to pin 720. Rod 716 prevents rotation of the pin in that rod 716 can only move vertically through cam 714 by means of recess 718.

There are various stages during the striking movement of the pin (FIGS. 6A-D). Rod 710 is initially situated at the lowest point 709 of cam 708. In this position hard pin 720 rests against window 702 (FIG. 6A).

Toothed wheel 706 is driven by electric motor 703 via worm wheel 704. Cam 708 rotates as a result. Rod 710 is displaced upward under the influence of edge surface 705 and thereby pushes hard pin 720 upward (FIG. 6B). Spring 712 is herein compressed. Tip 722 of hard pin 720 moves clear of window 702.

The vertical movement of pin 720 is continued until rod 710 reaches the highest point 712 of cam 708 (FIG. 6C). Rod 712 then moves abruptly over the highest point 711 and sharply downward to the lowest point 709 due to the force of spring 712 (FIG. 6D). Tip 722 of hard pin 720 strikes here against window 702, which thereby breaks. This movement is repeated as long as electric motor 703 is activated and thereby guarantees that window 702 is broken.

Alternatively, a window breaker is used in which the drive comprises an explosive charge.

When the car falls into water, this is detected by means of circuits 100 and 200. Buzzer 500 and LED 400 alert the passengers by means of sound and light. The system can be deactivated before the windows are broken by pressing knob 902. After a predetermined time delay, realized by circuit 600, the window breaker will be activated and pin 720 will break window 4 so that the passengers can escape from the vehicle.

The present invention is by no means limited to the above described preferred embodiments thereof. The rights sought are defined by the following claims, within the scope of which many modifications can be envisaged.

The invention claimed is:

1. Safety system for a vehicle, comprising:
   a window breaker comprising:
     a drive system; and
     a pin driven by the drive system for breaking a window; wherein the drive system comprises an explosive charge, and
   activating means operatively connected to the drive system for control thereof, wherein the activating means comprise a water sensor for controlling the drive system therewith, and
   wherein the window breaker is positioned close to a window of the vehicle such that the pin breaks the window through activation of the system, wherein the window breaker is integrated in a door or wall of the vehicle, and wherein the pin is directed at a peripheral side of the window.

2. Safety system as claimed in claim 1, wherein the water sensor is accommodated in a separate housing.

3. Safety system as claimed in claim 1, wherein the water sensor is accommodated in a housing which is provided with openings such that, if the housing is situated in water, the housing is filled within a determined period of time.

4. Safety system as claimed in claim 1, wherein the water sensor is embodied such that the water sensor activates the drive system if the sensor is substantially wholly enveloped by water.

5. Safety system as claimed in claim 4, wherein the water sensor comprises at least two detection elements.

6. Safety system as claimed in claim 1, comprising a capacitor for energy supply.

7. Safety system as claimed in claim 1, wherein the activating means control the drive system with a predetermined time delay.

8. Safety system as claimed in claim 1, comprising signalling means controlled by the activating means for the purpose of generating a warning signal.

9. Safety system as claimed in claim 1, further comprising an operating means for manual switch-on and switch-off of the activating means.

10. Safety system as claimed in claim 1, wherein the pin of the window breaker moves reciprocally in continuously repetitive manner during use.

11. Safety system as claimed in claim 1, comprising safety means controlled by the activating means and from the group consisting of:
- automatic alerting of emergency services;
- means for transmitting a GPS position;
- automatic seatbelt release means; and
- oxygen supply.

12. Method for breaking a window, comprising of providing a safety system as claimed in claim 1.

* * * * *